United States Patent
Etkin et al.

(10) Patent No.: US 10,356,735 B2
(45) Date of Patent: Jul. 16, 2019

(54) SYNCHRONIZING SIGNAL TRANSMISSIONS BY ANTENNA APPARATUSES

(71) Applicant: Hewlett Packard Enterprise Development LP, Houston, TX (US)

(72) Inventors: Raul Hernan Etkin, Palo Alto, CA (US); Jung Gun Lee, Palo Alto, CA (US); Sung-Ju Lee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 99 days.

(21) Appl. No.: 14/773,084

(22) PCT Filed: Mar. 7, 2013

(86) PCT No.: PCT/US2013/029672
§ 371 (c)(1),
(2) Date: Sep. 4, 2015

(87) PCT Pub. No.: WO2014/137346
PCT Pub. Date: Sep. 12, 2014

(65) Prior Publication Data
US 2016/0021627 A1    Jan. 21, 2016

(51) Int. Cl.
*H04W 56/00* (2009.01)
*H04J 3/06* (2006.01)
*H04L 12/18* (2006.01)

(52) U.S. Cl.
CPC ......... *H04W 56/001* (2013.01); *H04J 3/0658* (2013.01); *H04L 12/189* (2013.01)

(58) Field of Classification Search
CPC .... H04W 56/001; H04L 12/189; H04J 3/0658
See application file for complete search history.

(56) References Cited

U.S. PATENT DOCUMENTS

| 8,351,987 | B2 | 1/2013 | Boch | |
| 2006/0209752 | A1* | 9/2006 | Wijngaarden | H04W 4/04 370/328 |

(Continued)

FOREIGN PATENT DOCUMENTS

| EP | 180334 A2 | 4/2010 |
| EP | 2434835 A1 | 3/2012 |

OTHER PUBLICATIONS

International Search Report and Written Opinion, international Application No. PCT/US2013/029672, dated Dec. 6, 2013, pp. 1-10.

(Continued)

*Primary Examiner* — Derrick W Ferris
*Assistant Examiner* — Farhad Ali
(74) *Attorney, Agent, or Firm* — Mannava & Kang, P.C.

(57) ABSTRACT

According to an example, signal transmissions by a first antenna apparatus and a second antenna apparatus connected to a central processing apparatus through an Ethernet switch may be synchronized with respect to each other. An Ethernet packet containing first data and second data may be generated, in which the first antenna apparatus is to wirelessly transmit the first data and the second antenna apparatus is to wirelessly transmit the second data. In addition, the Ethernet packet may be communicated to the Ethernet switch, in which the Ethernet switch includes a first port that is in communication with the first antenna apparatus and a second port that is in communication with the second antenna apparatus, and the Ethernet switch is to communicate the Ethernet packet through the first port and a copy of the Ethernet packet through the second port substantially simultaneously with respect to each other.

19 Claims, 7 Drawing Sheets

(56) References Cited

U.S. PATENT DOCUMENTS

| | | |
|---|---|---|
| 2009/0300469 A1 | 12/2009 | Rajakarunanayake |
| 2010/0208777 A1* | 8/2010 | Ogaz .................. H04L 12/2838 |
| | | 375/219 |
| 2011/0182255 A1* | 7/2011 | Kim .................... H04W 88/085 |
| | | 370/329 |
| 2011/0243291 A1 | 10/2011 | McAllister et al. |
| 2012/0057572 A1 | 3/2012 | Evans et al. |
| 2012/0263152 A1 | 10/2012 | Fischer et al. |
| 2012/0314665 A1 | 12/2012 | Ishida et al. |
| 2013/0028194 A1 | 1/2013 | Chun et al. |
| 2013/0044028 A1* | 2/2013 | Lea ....................... H01Q 21/24 |
| | | 342/359 |

OTHER PUBLICATIONS

Yang Yang and Rick S. Blum, "Broadcast Consensus Based Phase Synchronization for Coherent MIMO Radar," Mar. 2011, pp. 1-6, IEEE.

Rahul et al., "JMB: scaling wireless capacity with user demands", Proceedings of the ACM SIGCOMM 2012 conference on Applications, technologies, architectures, and protocols for computer communication (SIGCOMM '12), 2012, pp. 235-246.

Perlman et al., "Distributed-Input-Distributed-Output (DIDO) Wireless Technology A New Approach to Multiuser Wireless", whitepaper available at [http://www.rearden.com/DIDO/DIDO White Paper 110727.pdf], date unknown, 19 pages.

International Preliminary Report on Patentability received for PCT Application No. PCT/US2013/029672, dated Sep. 17, 2015, 9 pages.

* cited by examiner

SYNCHRONIZING SIGNAL TRANSMISSIONS BY ANTENNA APPARATUSES

BACKGROUND

A distributed antenna system includes a central processing facility and a set of spatially-distributed antennas that are directly connected to the central processing facility. The spatially-distributed antennas are directly connected to the central processing facility through high-bandwidth capable connections, such as fiber optic cables, coaxial cables, or Ethernet cables. The central processing facility communicates the analog or digital RF signals through the connections for transmission of the RF signals by the antennas. The use of distributed antenna systems has significantly increased in recent years due to the cost savings that may be afforded by such systems, while also affording increased signal coverage.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are methods and apparatuses for synchronizing signal transmission by a plurality of antenna apparatuses in a distributed antenna system composed of a central processing apparatus and a plurality of antenna apparatuses. The distributed antenna system disclosed herein may be implemented in a switched Ethernet network environment such that the antenna apparatuses are not directly connected to the central processing apparatus, but instead, are connected through an Ethernet switch in the Ethernet network environment. In one example, the distributed antenna system disclosed herein may be implemented in an existing enterprise local area network (LAN) infrastructure environment. Thus, for instance, the central processing apparatus may communicate packetized data, e.g., broadcast/multicast frames, across the switched Ethernet network to the antenna apparatuses. In addition, the antenna apparatuses may wirelessly transmit signals contained in the packetized data in a substantially coordinated and synchronized manner with respect to each other.

A delay in the transmission of Ethernet packets through the Ethernet switch may occur due to, for instance, other network traffic that may affect the CPU load of the Ethernet switch and may affect the processing delay of the Ethernet packets. In addition, the length of the input and output queues of the Ethernet switch may vary over time and over ports, and may thus create time-varying switching and queuing delays. In addition, in many cases, these delays and their variability are orders of magnitude larger than the delay spread of the wireless channel.

Synchronization of the data transmissions may be desirable because adequate synchronization, e.g., synchronization errors that are smaller than the delay spread of a wireless channel, may result in enhanced performance of the distributed antenna system. As disclosed herein, synchronization of the data transmissions by the antenna apparatuses may be achieved through broadcasting/multicasting of Ethernet packets (e.g., under IEEE 802.3). The synchronization may also be enhanced through implementation of other techniques, such as traffic prioritization, port selection, and data encoding. According to an example, therefore, the synchronization may be achieved through implementation of relatively simple techniques that do not require highly sophisticated synchronization protocols or expensive equipment and are compatible with existing, commonly employed protocols.

In addition, all of the information transfer between the antenna apparatuses and the central processing apparatus may occur over an Ethernet backhaul, which enables the antenna apparatuses to be deployed in different locations. The use of the Ethernet backhaul therefore allows for improvements in network performance of the distributed antenna system in various ways, such as achieving relatively large throughput, higher reliability, supporting more client devices, etc. In addition, connecting the various antenna apparatuses to a central processor over an Ethernet connection, as opposed to having multiple separate radios, allows reduction in hardware and maintenance costs, reduction in power consumption, and for higher performance to be achieved by using cooperative multiple-input multiple-output (MIMO) communication techniques.

Figure 1:
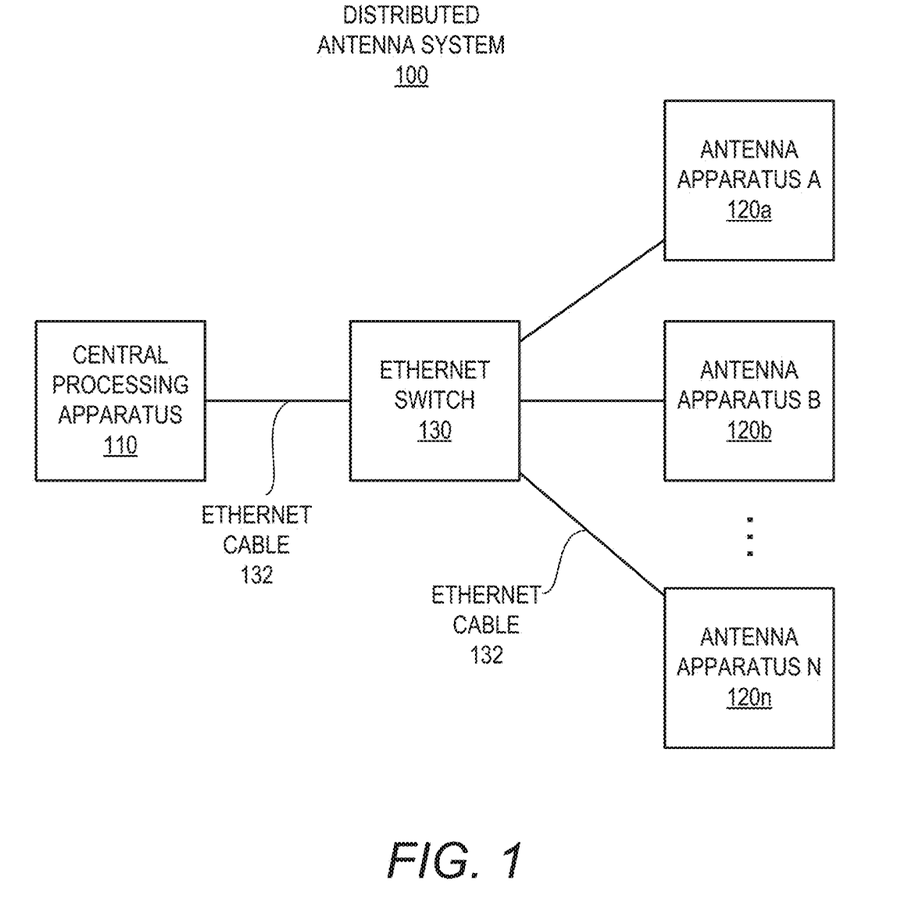
FIG. 1 depicts a simplified block diagram of a distributed antenna system, which may implement various features disclosed herein, according to an example of the present disclosure.

With reference first to FIG. 1, there is shown a simplified block diagram of a distributed antenna system 100, which may implement various features disclosed herein, according to an example. It should be understood that the distributed antenna system 100 may include additional elements and that some of the elements depicted therein may be removed and/or modified without departing from a scope of the distributed antenna system 100.

The distributed antenna system 100 may include a central processing apparatus 110 and a plurality of antenna apparatuses 120a-120n, in which "n" represents an integer greater than 1. The antenna apparatuses 120a-120n may be connected to the central processing apparatus 110 through an Ethernet switch 130 via Ethernet cables 132. In this regard, the central processing apparatus 110 may communicate Ethernet packets containing data to the antenna apparatuses 120a-120n, in which the antenna apparatuses 120a-120n may extract the data and wirelessly transmit signals containing the data. In addition, because the antenna apparatuses 120a-120n are connected to the central processing apparatus 110 through the Ethernet switch 130, the antenna apparatuses 120a-120n may be spatially distributed with respect to each other and the central processing apparatus 110. One result of this spatial distribution is that the coverage area over which the signals may be wirelessly transmitted may substantially be increased as compared with antenna systems in which antennas are directly connected to a base station.

According to an example, the central processing apparatus 110 is to generate the Ethernet packets to include data to be wirelessly transmitted by each of the antenna apparatuses 120a-120n in a substantially coordinated and synchronized manner with respect to each other. That is, for instance, each of the antenna apparatuses 120a-120n may wirelessly transmit signals such that beamforming of the signals may be accomplished by the antenna apparatuses 120a-120n. The antenna apparatuses 120a-120n may have hardware that adjusts the phases and/or amplitudes of the signals transmitted by the antenna apparatuses 120a-120n to assist in accomplishing the substantial coordination and synchronization. In one regard, the signals transmitted by the antenna apparatuses 120a-120n may not need to be precisely coordinated and synchronized because the receivers of the signals may be able to compensate for some variations in the signals while still being able to accurately process the data contained in the signals. The substantial coordination and synchronization of the signal transmissions by the antenna apparatuses 120a-120n may therefore be defined as coordination and synchronization that is sufficient to enable the receivers of the signals to compensate for variations in the signals.

Although not shown, Ethernet packets communicated from the central processing apparatus 110 may travel through a plurality of Ethernet switches 130 prior to reaching the antenna apparatuses 120a-120n. In one example, the distributed antenna system 100 may be incorporated into an existing switched network. In other examples, a switched network, i.e., a network containing a plurality of Ethernet switches 130, which may also be considered as a Local Area Network (LAN), may be formed to incorporate the distributed antenna system 100. In any regard, the Ethernet switch (es) 130 may handle both Ethernet packets communicated by the central processing apparatus 110 as well as Ethernet packets communicated from other nodes in the switched network. Accordingly, similarly to conventional switches in a switched network environment, for instance, the Ethernet switch 130 may determine the destination addresses of the Ethernet packets communicated from the central processing apparatus 110 and may forward the Ethernet packets to their intended destination addresses.

According to an example, the central processing apparatus 110 and the antenna apparatuses 120a-120n implement various techniques to enable substantially synchronized wireless transmission of signals by the antenna apparatuses 120a-120n. For instance, the central processing apparatus 110 may generate the Ethernet packets to include data that is to be wirelessly transmitted by each of the respective antenna apparatuses 120a-120n. Thus, for instance, the Ethernet packets may be generated to include first data for a first antenna apparatus 120a, second data for a second antenna apparatus 120b, and so forth. In addition, each of the antenna apparatuses 120a-120n may access the data that the antenna apparatuses 120a-120n are to respectively transmit and may delay transmission of their respective data for sufficient lengths of time to enable the synchronized transmission of the data. Thus, for instance, the delay by the first antenna apparatus 120a in transmitting the first data may be relatively longer than the delay by the second antenna apparatus 120b in transmitting the second data. In addition, the delays in transmitting the data may also include delays to compensate for the time used by the antenna apparatuses 120a-120n in processing the Ethernet packets. Thus, for instance, the delays may compensate for the time required to decode the Ethernet packets, apply a precoding matrix on the data contained in the Ethernet packets to identify the data that is to be transmitted by each of the antenna apparatuses, error detection, error correction, etc.

The Ethernet switch 130 may also implement various techniques to enable the substantially synchronized wireless transmission by the antenna apparatuses 120a-120n with respect to each other. For instance, the Ethernet switch 130 may be controlled to communicate Ethernet packets substantially simultaneously to the antenna apparatuses 120a-120n. Thus, for instance, the Ethernet switch 130 may be controlled to assign the Ethernet packets received from the central processing apparatus 110 a priority level that is higher than the packets received from other sources. In one example, the Ethernet switch 130 may assign the Ethernet packets received from the central processing apparatus 110 the highest priority.

Other techniques may also be implemented to ensure that the antenna apparatuses 120a-120n wirelessly transmit respective data in a substantially synchronized manner. For example, the ports in the Ethernet switch 130 to which each of the antenna apparatuses 120a-120n are connected may be on a common network interface card (NIC). By communicating the Ethernet packet and copies of the Ethernet packet through the ports of a common NIC, the delay in communicating the Ethernet packets may be substantially similar with respect to each other.

The central processing apparatus 110 may also substantially optimize (e.g., minimize) the amount of bandwidth consumed in communicating the Ethernet packets from the central processing apparatus 110 to the antenna apparatuses 120a-120n. For instance, the central processing apparatus 110 may include modules to communicate Ethernet packets that contain data that the antenna apparatuses 120a-120n may use to generate a stream of quadrature amplitude modulation (QAM) in phase/quadrature (I/Q) symbols. In addition, each of the antenna apparatuses 120a-120n may include modules to assemble the QAM I/Q symbols into I/Q sequences that the antenna apparatuses 120a-120n may wirelessly transmit. In one regard, therefore, the antenna apparatuses 120a-120n may obtain the I/Q sequences without requiring that the central processing apparatus 110 communicate full I/Q sequences over the switched Ethernet network.

Figure 2:
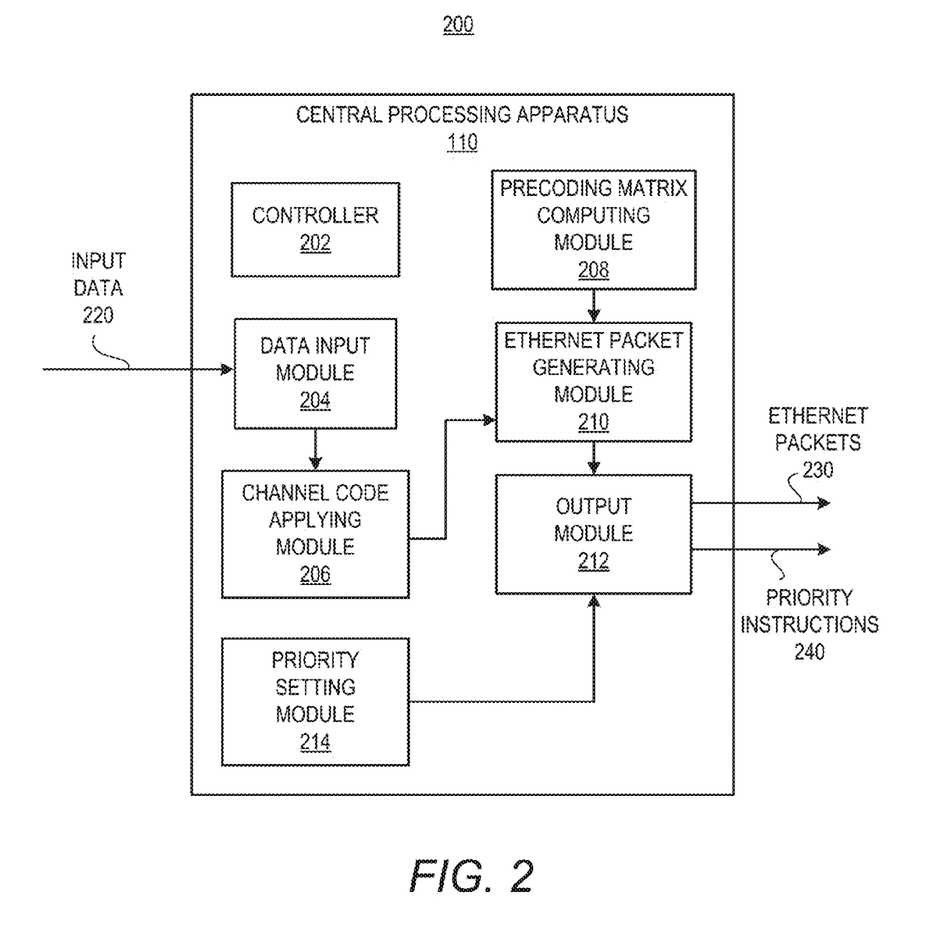
FIGS. 2 and 3 respectively depict simplified block diagrams of the central processing apparatus and an antenna apparatus depicted in FIG. 1, according to examples of the present disclosure.
Figure 3:
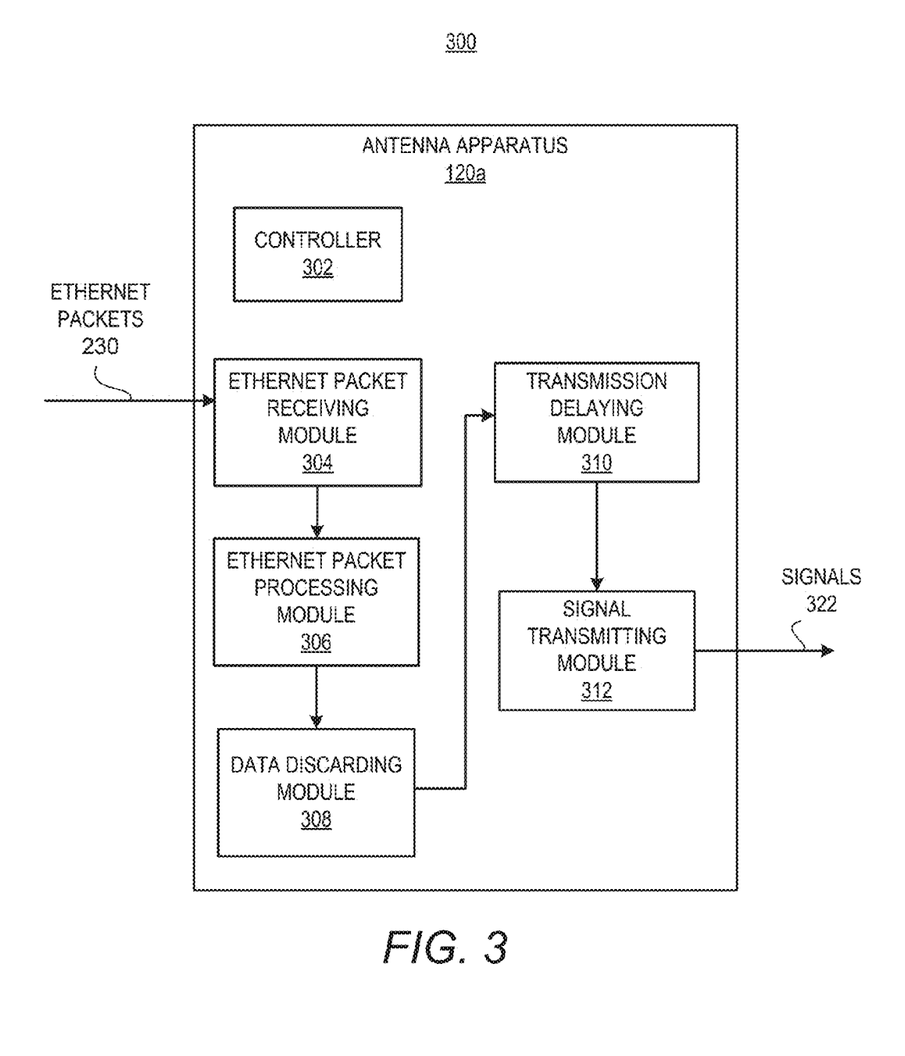

Turning now to FIGS. 2 and 3, there are respectively shown simplified block diagrams 200 and 300 of the central processing apparatus 110 and an antenna apparatus 120a depicted in FIG. 1, according to an example. It should be understood that the central processing apparatus 110 and the antenna apparatus 120a may include additional elements and that some of the elements depicted therein may be removed and/or modified without departing from the scopes of either of the central processing apparatus 110 and the antenna apparatus 120a.

With reference first to FIG. 2, the central processing apparatus 110 may include a controller 202, a data input module 204, a channel code applying module 206, a precoding matrix computing module 208, an Ethernet packet generating module 210, an output module 212, and a priority setting module 214. As shown in FIG. 2, the data input module 204 may receive input data 220 that is to be transmitted by the antenna apparatuses 120a-120n. The data input module 204 may receive the input data 220 as a stream of data bits or may receive the input data 220 as an entire compilation of data bits. In addition, the data input module 204 may receive the input data 220 from any suitable source, such as a computer, a server, a cellular telephone, etc.

The data input module 204 may forward the bits of the input data to the channel code applying module 206. The channel code applying module 206 may apply a channel code to the bits of input data 220 to provide resilience against random errors that may occur over the wireless channel. According to an example, the channel code applying module 206 may apply a channel code to the input data bits for real-time error correction and may convert a stream of the input data bits into a single codeword. The channel code applying module 206 may forward the channel coded input data bits to the Ethernet packet generating module 210.

The precoding matrix generating module 208 may compute a precoding matrix to be implemented by the antenna apparatuses 120a-120n in determining which portions of an orthogonal frequency division multiplexing (OFDM) frame each of the antenna apparatuses 120a-120n is to respectively transmit. Generally speaking, the precoding matrix may specify how symbols corresponding to each data stream are to be mapped to the antenna apparatuses 120a-120n. Thus, if N data streams are to be transmitted over M antenna apparatuses, the precoding matrix is an M×N matrix (with M rows and N columns). For example, if M=2 and N=1, the 2×1 mapping matrix with first row [1] and second row [1] repeats the symbols of the data stream into both transmit antenna apparatuses. The antenna apparatuses 120a-120n may determine the respective signals to be sent by multiplying the symbols of the various streams (represented as a vector) by the precoding matrix, and may extract the row corresponding to the given antenna apparatus to determine which data to send over the wireless channel. In addition, the precoding matrix generating module 208 may forward the computed precoding matrix to the Ethernet packet generating module 210.

The Ethernet packet generating module 210 may generate Ethernet packets to include the channel coded input data bits and the precoding matrix. The Ethernet packet generation may also include insertion of destination addresses corresponding to the antenna apparatuses 120a-120n in the headers of the Ethernet packets. According to an example, the Ethernet packet generating module 210 generates the Ethernet packets as broadcast frames or multicast frames. In the latter case, the antenna apparatuses 120a-120n may be in a multicast group with the central processing apparatus 110, in which the Ethernet packet generating module 210 may address the Ethernet packets to a multicast Internet protocol (IP) address corresponding to the multicast group.

In any regard, the output module 212 may communicate the Ethernet packets 230 to the Ethernet switch 130 to be communicated to the antenna apparatuses 120a-120n. In addition, the Ethernet switch may communicate the Ethernet packet and copies of the Ethernet packet to the antenna apparatuses 120a-120n substantially simultaneously with respect to each other.

The priority setting module 214 may output priority instructions 240 through the output module 212. The priority instructions 240 may control the Ethernet switch 130 to assign a priority level to the Ethernet packets received from the central processing apparatus 110 that is higher than packets received from other sources. The priority instructions 240 may be communicated directly to the Ethernet switch 130 or the priority instructions 240 may be communicated to a controller (not shown) of the Ethernet switch 130, e.g., a quality of service (QoS) controller of the Ethernet switch 130.

The controller 202 may be a microprocessor, a microcontroller, an application specific integrated circuit (ASIC), or the like. The controller 202 may perform various functions in the central processing apparatus 110, such as invoking or implementing the modules 204-214. According to an example, the modules 204-214 may be circuit components or individual circuits. According to another example, the modules 204-214 may be software modules, e.g., machine readable instructions, stored, for instance, in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. According to a further example, the modules 204-214 may be a combination of hardware and software modules.

With reference now to FIG. 3, the antenna apparatus 120a, which may be representative of the other antenna apparatuses 120b-120n, may include a controller 302, an Ethernet packet receiving module 304, an Ethernet packet processing module 306, a data discarding module 308, a transmission delaying module 310, and a signal transmitting module 312. The Ethernet packet receiving module 304 may receive the Ethernet packets 230 communicated by the central processing apparatus 110 via the Ethernet switch 130. As discussed above, the Ethernet switch 130 may communicate the Ethernet packets 230, which may include copies of the Ethernet packets 230, to the antenna apparatuses 120a-120n substantially simultaneously with respect to each other. In this regard, each of the antenna apparatuses 120a-120n may receive the Ethernet packets 230 substantially at the same time with respect to each other, e.g., within a few milliseconds of each other.

In addition, the Ethernet packet receiving module 304 may forward the received Ethernet packets 230 to the Ethernet packet processing module 306. The Ethernet packet processing module 306 may access the data contained in the Ethernet packets 230. This may include a determination as to which portions of the data are portions (e.g., first data) that the antenna apparatus 120a is to transmit as well as which portions of the data are portions (e.g., second data, third data, etc.) that the other antenna apparatuses 120b-120n are to transmit. For instance, the Ethernet packet processing module 306 may apply the precoding matrix contained in the Ethernet packets 230 to make this determination.

The Ethernet packet processing module 306 may also perform additional operations on the Ethernet packets 230. For instance, the Ethernet packet processing apparatus 306 may decode the Ethernet packets 230 and may perform error correction on the Ethernet packets 230. In another example, the Ethernet packet processing apparatus may generate OFDM I/Q samples from the Ethernet packets 230, assemble the OFDM I/Q samples, training sequences, and pilot sequences into an OFDM frame, and modulate the data bits contained in the Ethernet packets 230. The Ethernet packets 230 communicated to the antenna apparatus 120a may include the training sequences (and/or pilot sequences). The Ethernet packet processing module 306 may also identify the precoding matrix contained in the Ethernet packets 230 and may apply the identified precoding matrix on the OFDM frame. According to an example, the OFDM frame contains all of the signals that are to be transmitted by each of the antenna apparatuses 120a-120n. As such, the precoding matrix may be applied, for instance, the data contained in the OFDM frame may be multiplied with the precoding matrix, to determine which portion of the OFDM frame pertains to the antenna apparatus 120a. In other words, the Ethernet packet processing module 306 may determine the I/Q sequence that is to be transmitted by the antenna apparatus 120a and may forward that I/Q sequence to the signal transmitting module 312. The signal transmitting module 312 may wirelessly transmit signals 322 containing the I/Q sequence for that antenna apparatus 120a.

Prior to transmission of the signals 322 by the signal transmitting module 312, the data discarding module 308 may discard the data contained in the Ethernet packets 230 that is to be transmitted by the other antenna apparatuses 120b-120n. In addition, the transmission delaying module 310 may delay transmission of the signals 322 for a predetermined length of time. For instance, the transmission delaying module 310 may delay transmission of the first data (e.g., data to be transmitted by the antenna apparatus 120a) until all the data to be transmitted by the other antenna apparatuses 120b-120n have been processed and discarded. The transmission delaying module 310 may also delay transmission of the first data by a first predetermined length of time to compensate for a delay in processing of the Ethernet packets 230 by the other antenna apparatuses 120b-120n. Thus, for instance, the first predetermined length of time may correspond to the amount of time each of the other antenna apparatuses 120b-120n consume in respectively processing their Ethernet packets for their respective data. In addition, each of the antenna apparatuses 120a-120n may operate with a transmission delay, in which the transmission delays, e.g., predetermined lengths of time, for each of the antenna apparatuses 120a-120n is selected to substantially synchronize transmissions of the signals by the antenna apparatuses 120a-120n with respect to each other. In one regard, therefore, the lengths of the transmission delays may differ for each of the antenna apparatuses 120a-120n.

The controller 302 may be a microprocessor, a microcontroller, an application specific integrated circuit (ASIC), or the like. The controller 302 may perform various functions in the antenna apparatus 120a, such as invoking or implementing the modules 304-312. According to an example, the modules 304-312 may be circuit components or individual circuits. According to another example, the modules 304-312 may be software modules, e.g., machine readable instructions, stored, for instance, in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. According to a further example, the modules 304-312 may be a combination of hardware and software modules.

Although not shown, the antenna apparatus 120a may also include RF hardware, such as an analog to digital/digital to analog (AD/DA) converter, a modulator, a power amplifier, etc., to transmit signals over a wireless medium.

Figure 4:
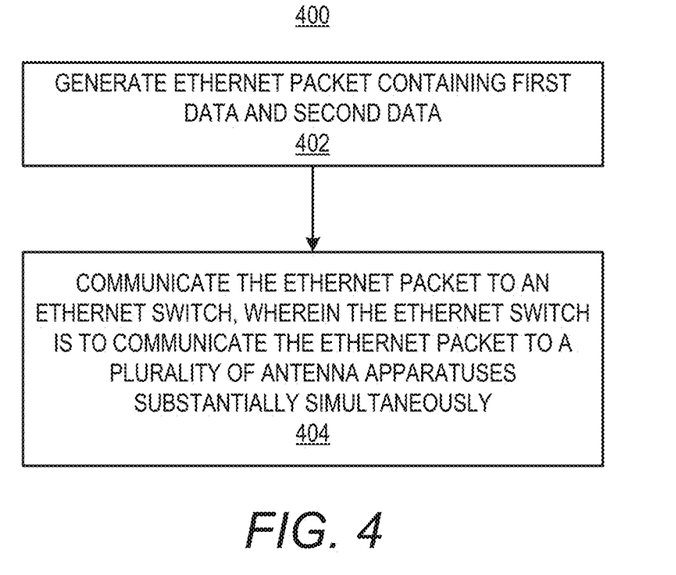
FIG. 4 shows a flow diagram of a method for synchronizing signal transmission by a first antenna apparatus and a second antenna apparatus connected to a central processing apparatus through an Ethernet switch, according to an example of the present disclosure.

Turning now to FIG. 4, there is shown a flow diagram of a method 400 for synchronizing signal transmissions by a first antenna apparatus 120a and a second antenna apparatus 120b connected to a central processing apparatus 110 through an Ethernet switch 130, according to an example. It should be apparent to those of ordinary skill in the art that the method 400 represents a generalized illustration and that other operations may be added or existing operations may be removed, modified or rearranged without departing from a scope of the method 400. For instance, although particular reference is made herein to the first antenna apparatus 120a and the second antenna apparatus 120b, it should be clearly understood that the features discussed herein may equally be applicable to the remaining antenna apparatuses 120c-120n.

At block 402, in the central processing apparatus 110, an Ethernet packet 230 containing first data and second data may be generated, for instance, by the Ethernet packet generating module 210. The first antenna apparatus 120a is to wirelessly transmit the first data and the second antenna apparatus 120b is to wirelessly transmit the second data in a substantially synchronized manner with respect to each other. According to an example, the first data is positioned in the Ethernet packet 230 to be accessed prior to the second data. According to another example, the first data is composed of a plurality of first data blocks and the second data is composed of a plurality of second data blocks. In this example, the plurality of first data blocks may be interleaved with the plurality of second data blocks in the Ethernet packet 230.

The generation of the Ethernet packet may also include additional operations, such as, channel coding of the data, computing of a precoding matrix, etc., and insertion of additional information into the Ethernet packet as discussed above. In addition, the Ethernet packet generating module 210 may generate the Ethernet packets 230 from the bits of input data 220 through implementation of any suitable Ethernet packet generation scheme. Moreover, the Ethernet packets 230 may be generated to include destination addresses of the plurality of antenna apparatuses 120a-120n in the packet headers or as broadcast/multicast packets/frames.

At block 404, the Ethernet packet 230 is communicated to an Ethernet switch 130, for instance, by the output module 212. According to an example, the Ethernet packet 230 is a broadcast frame and is thus intended to be delivered to all of the antenna apparatuses 120a-120n on the same network as the central processing apparatus 110. In another example, the Ethernet packet 230 is a multicast frame and is intended to be delivered to the antenna apparatuses 120a-120n that are part of the multicast group of the central processing apparatus 110.

In any regard, the Ethernet switch 130 is to copy the Ethernet packet 230 and to communicate the Ethernet packet 230 and copies of the Ethernet packet 230 to the antenna apparatuses 120a-120n substantially simultaneously with respect to each other. In other words, the Ethernet switch 130 is to communicate the Ethernet packet 230 and the copies of the Ethernet packet 230 at substantially the same time such that the antenna apparatuses 120a-120n may receive the Ethernet packets 230 at substantially the same time, for instance, within a few milliseconds with respect to each other.

As discussed above, each of the antenna apparatuses 120a-120n may be connected to the same NIC to generally increase the likelihood that the Ethernet packets 230 are communicated to the antenna apparatuses 120a-120n at substantially the same time. In addition, or alternatively, the Ethernet switch 130 may assign the Ethernet packets 230 with a higher priority, and in some examples, the highest priority, over other packets traversing the Ethernet switch 130.

Figure 5:
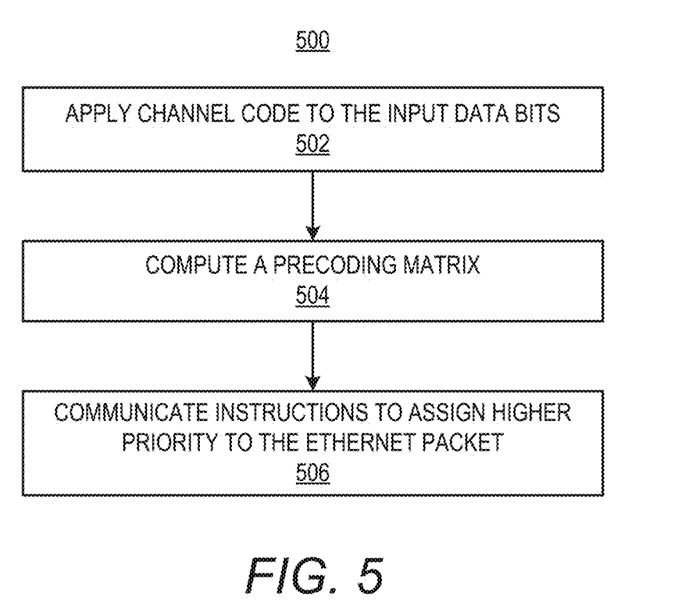
FIG. 5 shows a flow diagram of a method for generating Ethernet packets at a central processing apparatus, according to an example of the present disclosure.

Turning now to FIG. 5, there is shown a flow diagram of a method 500 for generating Ethernet packets 230 at the central processing apparatus 110, according to an example. In one regard, the method 500 depicts operations that the central processing apparatus 110 may perform prior to generation of the Ethernet packets 230 at block 402 in the method 400.

At block 502, a channel code may be applied to the input data bits 220, for instance, by the channel code applying module 206. Particularly, the channel code applying module 206 may apply a channel code to provide resilience against random errors that may occur over the wireless channel. According to an example, the channel code applying module 206 may apply a channel code to the input data bits for real-time error correction and may convert a stream of the input data bits into a single codeword.

At block 504, a precoding matrix may be computed, for instance, by the precoding matrix computing module 208. In addition, the Ethernet packets 230 may be generated to include the channel coded input data bits and the precoding matrix, for instance, as discussed above with respect to block 402 in FIG. 4.

At block 506, instructions to cause the Ethernet switch 130 to assign the Ethernet packet higher priority as compared with packets having destination addresses other than the Ethernet packet to be delivered by the Ethernet switch 130 may be communicated, for instance, by the priority setting module 214. The priority setting module 214 may communicate the instructions directly to the Ethernet switch 130 or to a controller (not shown) of the Ethernet switch 130. In any regard, the assigning of the Ethernet packet to have a higher priority may be implemented to generally increase the likelihood that the Ethernet packet 230 and copies of the Ethernet packet 230 are delivered to the antenna apparatuses 120a-120n at substantially the same time with respect to each other.

Figure 6:
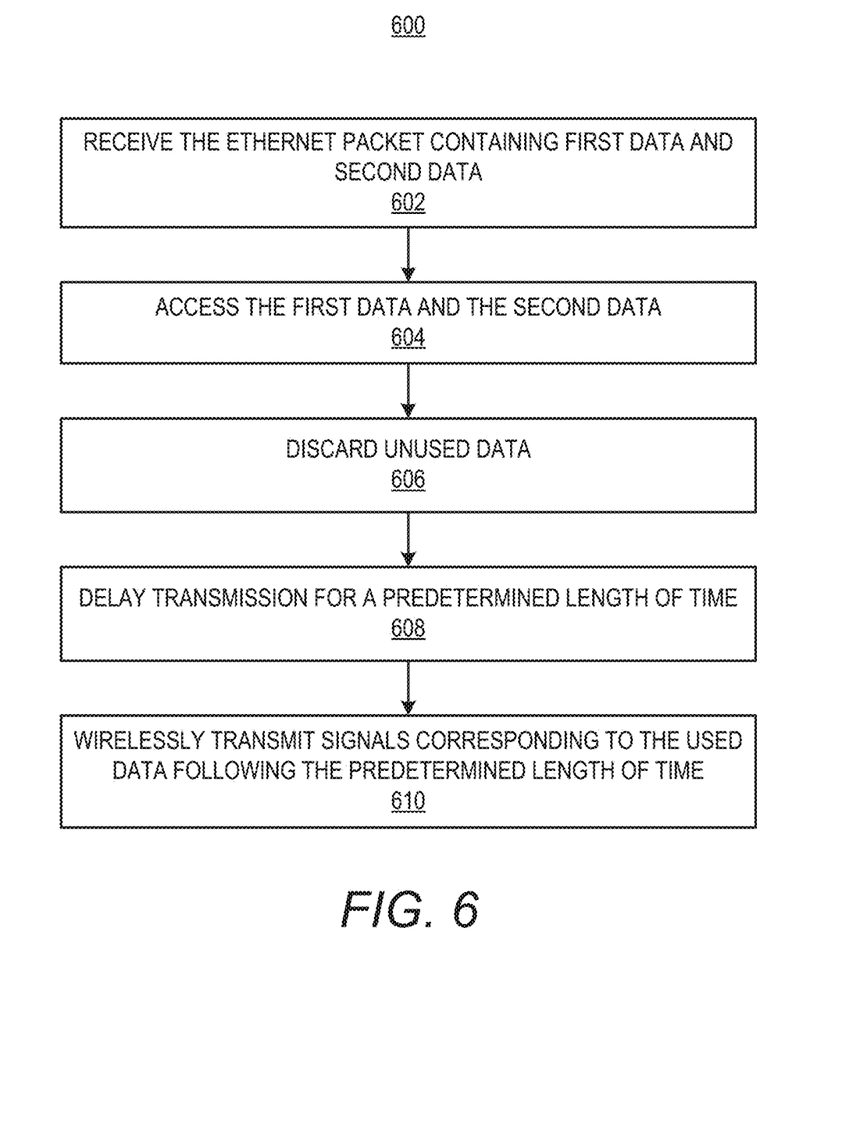
FIG. 6 illustrates a flow diagram of a method for processing Ethernet packets and wirelessly transmitting signals at an antenna apparatus, according to an example of the present disclosure.

Turning now to FIG. 6, there is shown a flow diagram of a method 600 for processing the Ethernet packets 230 and wirelessly transmitting signals at an antenna apparatus 120a, according to an example. Although the description of FIG. 6 is made with particular reference to a first antenna apparatus 120a, it should be understood that the operations described herein are applicable to the other antenna apparatuses 120b-120n.

At block 602, the Ethernet packet 230 containing the first data and the second data may be received, for instance, by the Ethernet packet receiving module 304. At block 604, the first data and the second data may be accessed, for instance, to determine which of the data is to be used by the antenna apparatus 120a from the Ethernet packet 230, for instance, by the Ethernet processing module 306. In addition, at block 606, the unused data may be discarded, for instance, by the data discarding module 310.

At block 608, transmission of the used data may be delayed for a predetermined length of time, for instance, by the transmission delaying module 310. The predetermined length of time may be determined in any of the manners discussed above. In addition, at block 610, the signals corresponding to the used data may be wirelessly transmitted following the predetermined length of time, for instance, by the signal transmitting module 312.

Although not shown in FIG. 6, the Ethernet packet 230 may be processed in any of the manners discussed above. Thus, for instance, OFDM I/Q samples may be generated from the Ethernet packets 230, the OFDM I/Q samples may be assembled with training and pilot sequences to generate an OFDM frame, the data bits contained in the Ethernet packets 230 may be modulated, and the OFDM frame may be precoded using a precoding matrix. In other examples, the antenna apparatus 120a may perform other processing functions, such as decoding and error checking on the Ethernet packet 230.

In addition, when the method 600 is implemented by a second antenna apparatus 120b, the second antenna apparatus 120b may access the second data at block 604 and discard the first data at block 606. This process may be performed by the remaining antenna apparatuses 120c-120n.

Figure 7A:
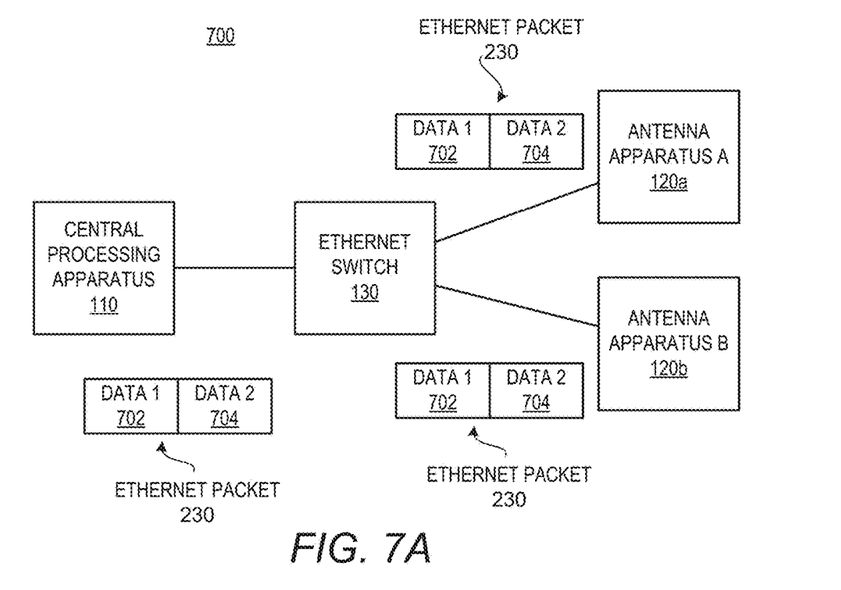
FIGS. 7A and 7B respectively show a diagram of a packet transmission through an Ethernet switch and a timing diagram corresponding to the diagram of FIG. 7A, according to an example of the present disclosure.
Figure 7B:
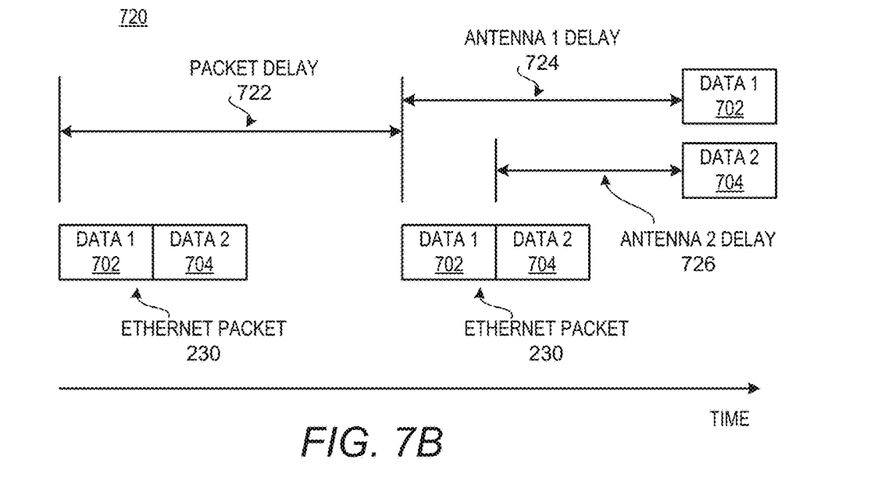

Turning now to FIGS. 7A and 7B, there are respectively shown a diagram 700 of a packet transmission through an Ethernet switch 130 and a timing diagram 720 corresponding to the diagram 700, according to an example. As shown in FIG. 7A, an Ethernet packet 230 containing a first data 702 and a second data 704 is depicted as being communicated to both the first antenna apparatus 120a and the second antenna apparatus 120b.

As shown in the timing diagram 720 in FIG. 7B, a propagation and switching delay 722 for the Ethernet packet 230 is depicted as occurring between the central processing apparatus 110 and the Ethernet switch 130. In addition, a first delay 724 corresponding to the first antenna apparatus 120a is depicted as occurring prior to the first data 702 being ready for transmission by the first antenna apparatus 120a. Moreover, a second delay 726 is depicted as occurring prior to the second data 704 being ready for transmission by the second antenna apparatus 120b. As further shown in FIG. 7B, the first antenna apparatus 120a and the second antenna apparatus 120b may implement delays of different lengths of time to enable the first data 702 and the second data 704 to be wirelessly transmitted in a substantially synchronized manner. The delays for the first antenna apparatus 120a and the second antenna apparatus 120b may thus be predetermined to enable such substantial synchronization of the wireless transmissions.

According to an example in which the first data 702 is composed of a plurality of first data blocks and the second data 704 is composed of a plurality of second data blocks, the first data blocks may be interleaved with the second data blocks in the Ethernet packer 230. In this example, the delays in the first antenna apparatus 120a and the second antenna apparatus 120b may be substantially reduced such that transmission of portions of the first data 702 and the second data 704 may begin prior to receipt of all of the first data blocks or all of the second data blocks. In one regard, the latency in transmitting the signals by the antenna apparatuses 120a-120n may substantially be reduced by making each of the interleaved data blocks as small as possible. However, each of the data blocks may be encoded using error correcting or detecting code, whose performance (in terms of error probability and redundancy) may degrade as the data blocks become smaller. As such, the data block length may be selected through consideration of a tradeoff between latency, error performance, and overhead.

Some or all of the operations set forth in the methods 400-600 may be contained as a utility, program, or subprogram, in any desired computer accessible medium. In addition, the methods 400-600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 8:
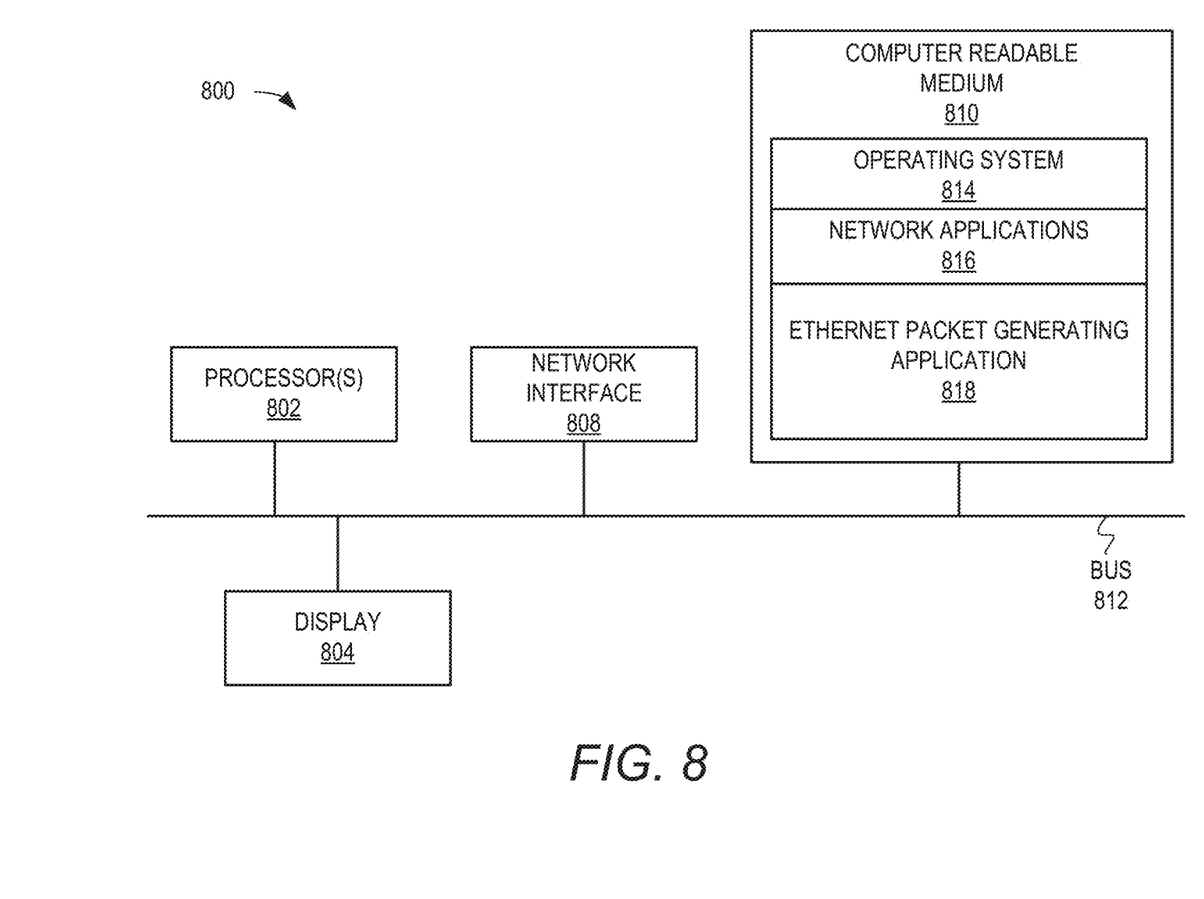
FIG. 8 illustrates a schematic representation of a computing device, which may be employed to perform various functions of the central processing apparatus depicted in FIGS. 1 and 2, according to an example of the present disclosure.

Turning now to FIG. 8, there is shown a schematic representation of a computing device 800, which may be employed to perform various functions of the central processing apparatus 110 depicted in FIGS. 1 and 2, according to an example. The device 800 may include a processor 802, a display 804, such as a monitor; a network interface 808, such as a Local Area Network LAN, a wireless 802.11x LAN, a 3G mobile WAN or a WiMax WAN; and a computer-readable medium 810. Each of these components may be operatively coupled to a bus 812. For example, the bus 812 may be an EISA, a PCI, a USB, a FireWire, a NuBus, or a PDS.

The computer readable medium 810 may be any suitable medium that participates in providing instructions to the processor 802 for execution. For example, the computer readable medium 810 may be non-volatile media, such as an optical or a magnetic disk; volatile media, such as memory. The computer-readable medium 810 may also store an operating system 814, such as Mac OS, MS Windows, Unix, or Linux; network applications 816; and an Ethernet packet generating application 818. The operating system 814 may be multi-user, multiprocessing, multitasking, multithreading, real-time and the like. The operating system 814 may also perform basic tasks such as recognizing input from input devices, such as a keyboard or a keypad; sending output to the display 804; keeping track of files and directories on the computer readable medium 810; controlling peripheral devices, such as disk drives, printers, image capture device; and managing traffic on the bus 812. The network applications 816 may include various components for establishing and maintaining network connections, such as machine-readable instructions for implementing communication protocols including TCP/IP, HTTP, Ethernet, USB, and FireWire.

The Ethernet packet generating application 818 may provide various components for generating Ethernet packets from input data bits and communicating the Ethernet packets over a switched network environment, as described above with respect to the methods 400 and 500 in FIGS. 4 and 5. The Ethernet packet generating application 818 may thus include the data input module 204, the channel code applying module 206, the precoding matrix computing module 208, the Ethernet packet generating module 210, the output module 212, and the priority setting module 214. In certain examples, some or all of the processes performed by the Ethernet packet generating application 818 may be integrated into the operating system 814. In certain examples, the processes may be at least partially implemented in digital electronic circuitry, or in computer hardware, machine-readable instructions (including firmware and/or software), or in any combination thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   generating an Ethernet packet containing first data and second data, wherein a first antenna apparatus is to wirelessly transmit the first data and a second antenna apparatus is to wirelessly transmit the second data in a substantially synchronized manner with respect to each other; and
   communicating the Ethernet packet to an Ethernet switch, wherein:
     the Ethernet switch comprises a first port in communication with the first antenna apparatus and a second port in communication with the second antenna apparatus;
     the first port and the second port are on a common Network Interface Card (NIC); and
     the Ethernet switch communicates the Ethernet packet to the first port and a copy of the Ethernet packet to the second port through the NIC;
   communicating the Ethernet packet and copies of the Ethernet packet containing the first data and the second data from the NIC to the first antenna apparatus; and
   communicating the Ethernet packet and copies of the Ethernet packet containing the first data and the second data from the NIC to the second antenna apparatus, wherein the first antenna apparatus is directly connected to the NIC via a first Ethernet cable and the second antenna apparatus is directly connected to the NIC via a second Ethernet cable,
   wherein generating the Ethernet packet further comprises generating the Ethernet packet to position the first data and the second data sequentially, wherein generating the Ethernet packet to position the first data and the second data further comprises:
     receiving the Ethernet packet at the first antenna apparatus;
     accessing the first data and the second data at the first antenna apparatus;
     discarding the second data at the first antenna apparatus;
     wirelessly transmitting signals corresponding to the first data by the first antenna apparatus;
     receiving the Ethernet packet at the second antenna apparatus;
     accessing the first data and the second data at the second antenna apparatus;
     discarding the first data at the second antenna apparatus; and wirelessly transmitting signals corresponding to the second data by the second antenna apparatus.

2. The method of claim 1, wherein:
the first antenna apparatus and the second antenna apparatus are in a multicast group with a central processing apparatus; and
the Ethernet packet comprises a multicast frame addressed to a multicast Internet protocol (IP) address corresponding to the multicast group.

3. The method of claim 1, further comprising assigning the Ethernet packet a priority, wherein the assigned priority is greater than the priority of packets having destination addresses other than the Ethernet packet to be delivered by the Ethernet switch.

4. The method of claim 1, wherein generating the Ethernet packet further comprises generating the Ethernet packet to be encoded, wherein generating the Ethernet packet to be encoded further comprises:
decoding the encoded Ethernet packet at the first antenna apparatus;
performing error correction at the first antenna apparatus;
delaying transmission of the signal by a first predetermined length of time, wherein the delay of transmission compensates for a delay in processing of the Ethernet packet by the second antenna apparatus;
decoding the encoded Ethernet packet at the second antenna apparatus;
performing error correction at the first antenna apparatus; and
delaying transmission of the signal by the second antenna apparatus by a second predetermined length of time, wherein:
the delay of the transmission compensates for a delay in processing of the Ethernet packet by the first antenna apparatus; and
the first predetermined length of time and the second predetermined length of time are selected to enable substantially synchronized transmission of the signals by the first antenna apparatus and the second antenna apparatus.

5. The method of claim 1, wherein:
the first data comprises a plurality of first data blocks;
the second data comprises a plurality of second data blocks; and
generating the Ethernet packet further comprises generating the Ethernet packet to interleave the plurality of first data blocks with the plurality of second data blocks.

6. The method of claim 5, wherein the first antenna apparatus and the second antenna apparatus begin transmission of their respective signals prior to receipt of all of the first data blocks and the second data blocks while maintaining substantial synchronization of their signal transmissions.

7. The method of claim 1, further comprising:
assigning the Ethernet packet to have a higher priority as compared with packets having destination addresses other than the Ethernet packet to be delivered by the Ethernet switch, wherein assigning a higher priority causes the Ethernet packet to be sent prior to packets having the other destination addresses.

8. The method of claim 1, wherein the first port and the second port of the Ethernet switch are connected to a common network interface card in the Ethernet switch.

9. A system comprising:
a central processing apparatus; and
a plurality of antenna apparatuses connected to the central processing apparatus via a plurality of Ethernet cables through an Ethernet switch, wherein:
the plurality of antenna apparatuses are spatially distributed with respect to each other; and
the central processing apparatus generates an Ethernet packet containing a first data and a second data, wherein:
a first antenna apparatus of the plurality of antenna apparatuses wirelessly transmits the first data; and
a second antenna apparatus of the plurality of antenna apparatuses wirelessly transmits the second data in a substantially synchronized manner with respect to the first antenna;
the central processing apparatus communicates the Ethernet packet to the Ethernet switch;
the Ethernet switch communicates the Ethernet packet to the first antenna apparatus and a copy of the Ethernet packet to the second antenna apparatus through a Network Interface Card (NIC);
the Ethernet switch communicates the Ethernet packet and copies of the Ethernet packet containing the first data and the second data from the NIC to the first antenna apparatus; and
the Ethernet switch communicates the Ethernet packet and copies of the Ethernet packet containing the first data and the second data from the NIC to the second antenna apparatus, wherein the first antenna apparatus is directly connected to the NIC via a first Ethernet cable of the plurality of Ethernet cables and the second antenna apparatus is directly connected to the NIC via a second Ethernet cable of the plurality of Ethernet cables,
wherein generating the Ethernet packet further comprises generating the Ethernet packet to position the first data and the second data sequentially, wherein generating the Ethernet packet to position the first data and the second data further comprises:
receiving the Ethernet packet at the first antenna apparatus;
accessing the first data and the second data at the first antenna apparatus;
discarding the second data at the first antenna apparatus;
wirelessly transmitting signals corresponding to the first data by the first antenna apparatus;
receiving the Ethernet packet at the second antenna apparatus;
accessing the first data and the second data at the second antenna apparatus;
discarding the first data at the second antenna apparatus; and
wirelessly transmitting signals corresponding to the second data by the second antenna apparatus.

10. The system of claim 9, further comprising the central processing apparatus to communicate instructions to cause the Ethernet switch to assign the Ethernet packet higher priority over packets having destination addresses other than the Ethernet packet to be delivered by the Ethernet switch.

11. The system of claim 9, wherein:
the first antenna apparatus delays transmission of the first data for a first predetermined length of time; and
the second antenna apparatus delays transmission of the second data for a second predetermined length of time, wherein the first predetermined length of time and the second predetermined length of time are selected to enable substantially synchronized transmission of the first data by the first antenna apparatus and the second data by the second antenna apparatus.

12. The system of claim 9, wherein:
the first data comprises a plurality of first data blocks;
the second data comprises a plurality of second data blocks; and
the plurality of first data blocks are interleaved with the plurality of second data blocks in the Ethernet packet.

13. The system of claim 12, wherein:
the first antenna apparatus and the second antenna apparatus begin transmission of their respective data prior to receipt of all of the first data blocks and the second data blocks; and
the first antenna apparatus and the second antenna apparatus maintain substantial synchronization of their data transmissions.

14. A central processing apparatus comprising:
a module to generate an Ethernet packet that contains a first data and a second data, wherein:
  a first antenna apparatus is to wirelessly transmit the first data; and
  a second antenna is to wirelessly transmit the second data in a substantially synchronized manner with respect to the first antenna apparatus; and
a module to communicate the Ethernet packet to an Ethernet switch, wherein:
  the Ethernet switch comprises a first port in communication with the first antenna apparatus and a second port in communication with the second antenna apparatus;
  the first port and the second port are on a common Network Interface Card (NIC);
  the Ethernet switch communicates the Ethernet packet to the first port and a copy of the Ethernet packet to the second port through the NIC;
  the Ethernet switch communicates the Ethernet packet and copies of the Ethernet packet containing the first data and the second data from the NIC to the first antenna apparatus; and
  the Ethernet switch communicates the Ethernet packet and copies of the Ethernet packet containing the first data and the second data from the NIC to the second antenna apparatus, wherein the first antenna apparatus is directly connected to the NIC via a first Ethernet cable and the second antenna apparatus is directly connected to the NIC via a second Ethernet cable,
wherein generating the Ethernet packet further comprises generating the Ethernet packet to position the first data and the second data sequentially, wherein generating the Ethernet packet to position the first data and the second data further comprises:
  receiving the Ethernet packet at the first antenna apparatus;
  accessing the first data and the second data at the first antenna apparatus;
  discarding the second data at the first antenna apparatus;
  wirelessly transmitting signals corresponding to the first data by the first antenna apparatus;
  receiving the Ethernet packet at the second antenna apparatus;
  accessing the first data and the second data at the second antenna apparatus;
  discarding the first data at the second antenna apparatus; and
  wirelessly transmitting signals corresponding to the second data by the second antenna apparatus.

15. The apparatus of claim 14, further comprising a module to generate a precoding matrix, the precoding matrix generation module to:
  determine an arrangement of symbols are to be mapped to the first antenna apparatus and the second antenna apparatus; and
  transmit a computed precoding matrix to the Ethernet packet generating module.

16. The apparatus of claim 14, wherein the module to generate an Ethernet packet is further to generate an Ethernet packet including a precoding matrix, wherein the precoding matrix is generated by the precoding matrix generating module.

17. The apparatus of claim 16, wherein the module to generate an Ethernet packet is further to generate an Ethernet packet including a destination address of the antenna apparatus to which the Ethernet packet is to be sent.

18. The apparatus of claim 14, further comprising an Ethernet packet processing module to:
  decode a transmitted Ethernet packet;
  determine a precoding matrix encoded within the Ethernet packet; and
  apply the precoding matrix to the decoded Ethernet packet to determine that a first portion of the data is first data and that a second portion of the data is second data.

19. The apparatus of claim 14, further comprising a priority setting module to:
  determine a priority level of an Ethernet packet generated by the Ethernet packet generating module; and
  transmit the priority level to the Ethernet switch.

* * * * *